(12) United States Patent
Kwak et al.

(10) Patent No.: US 8,008,375 B2
(45) Date of Patent: *Aug. 30, 2011

(54) POLY(VINYL CHLORIDE) PRODUCT CONTAINING CYCLODEXTRIN DERIVATIVES WITH SUPPRESSION OF THE MIGRATION OF PLASTICIZER AND MANUFACTURING METHOD THEREOF

(75) Inventors: Seung-Yeop Kwak, Seoul (KR); Sang-Jae Jung, Gwanak-Gu (KR); Jae-Woo Chung, Seoul (KR)

(73) Assignee: SNU R&DB Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/989,798

(22) PCT Filed: May 23, 2007

(86) PCT No.: PCT/KR2007/002532
§ 371 (c)(1),
(2), (4) Date: Jan. 29, 2008

(87) PCT Pub. No.: WO2007/142418
PCT Pub. Date: Dec. 13, 2007

(65) Prior Publication Data
US 2009/0286908 A1    Nov. 19, 2009

(30) Foreign Application Priority Data

Jun. 8, 2006  (KR) .......................... 10-2006-0051572

(51) Int. Cl.
*C08B 37/00* (2006.01)
*C08L 3/02* (2006.01)
*C08L 5/16* (2006.01)
*C08L 5/00* (2006.01)
*A61K 8/73* (2006.01)
*C08F 251/02* (2006.01)

(52) U.S. Cl. .............................. 524/48; 524/27; 527/313
(58) Field of Classification Search .................... 524/27, 524/48; 526/202, 238.2; 527/313
See application file for complete search history.

(56) References Cited

U.S. PATENT DOCUMENTS
4,722,815 A * 2/1988 Shibanai ....................... 264/117
(Continued)

FOREIGN PATENT DOCUMENTS
JP       62169844 A * 7/1987
(Continued)

OTHER PUBLICATIONS
Translation JP 6216944 2009.*
(Continued)

*Primary Examiner* — Mark Eashoo
*Assistant Examiner* — Liam J Heincer
(74) *Attorney, Agent, or Firm* — Edwards Angell Palmer & Dodge LLP; Kongsik Kim

(57) ABSTRACT

The present invention relates to a PVC product containing cyclodextrin derivative particles and capable of suppressing migration of a plasticizer and a method for manufacturing the same, which includes (S1) preparing cyclodextrin derivative particles, in which a hydroxyl functional group is replaced by a predetermined compound; (S2) inputting the cyclodextrin derivative particles, a water-based dispersion medium and a vinyl chloride monomer into a high-pressure reactor and performing polymerization to obtain cyclodextrin derivative particles-capsulated PVC particles, in which a plurality of the cyclodextrin derivative particles are dispersedly capsulated in PVC particles; and (S3) mixing the cyclodextrin derivative particles-capsulated PVC particles with a low molecular weight liquid plasticizer and molding the mixture in a predetermined shape using heat.

9 Claims, 11 Drawing Sheets

U.S. PATENT DOCUMENTS

| | | | |
|---|---|---|---|
| 4,725,657 A * | 2/1988 | Shibanai | 424/486 |
| 5,696,186 A * | 12/1997 | Videau | 524/48 |
| 5,777,003 A | 7/1998 | Haas et al. | |
| 2002/0006991 A1 * | 1/2002 | Wood et al. | 524/48 |
| 2002/0025946 A1 * | 2/2002 | Buchanan et al. | 514/58 |
| 2002/0197469 A1 * | 12/2002 | Clikeman et al. | 428/343 |
| 2003/0083404 A1 * | 5/2003 | Frank et al. | 524/27 |
| 2003/0109492 A1 * | 6/2003 | Loftsson | 514/58 |
| 2006/0192179 A1 * | 8/2006 | Wehner et al. | 252/400.1 |
| 2007/0128879 A1 * | 6/2007 | Rhee et al. | 438/758 |
| 2007/0149479 A1 * | 6/2007 | Fischer et al. | 514/58 |
| 2007/0212400 A1 * | 9/2007 | Kuwabara | 424/443 |
| 2008/0200592 A1 * | 8/2008 | Kwak et al. | 524/48 |

FOREIGN PATENT DOCUMENTS

| | | |
|---|---|---|
| KR | 100676942 B1 * | 2/2007 |
| WO | WO-03/018684 A2 | 3/2003 |

OTHER PUBLICATIONS

Allsoop et al. Vinyl Chloride Polymers, John Wiley and Sons, 2002.*
Machine Translation of KR 10-0676942 2010.*
K. Sreenivasan, "Effect of Blending β-Cyclodextrin with Poly(vinyl chloride) on the Leaching of Phthalate Ester to Hydrophilic Medium", J of Applied Polymer Science, vol. 59, 2089-2093 (1996).
Jozsef Szejtli, "Introduction and General Overview of Cyclodextrin Chemistry", Chem. Rev., 1998, vol. 98 (5); 1743-1753.
Song et al., "Water Solubility Enhancement of Phthalates by Cetyltrimethylammonium Bromide and β-cyclodextrin", Ind. Eng. Chem. Res., 2003, vol. 42(5), 949-955.

* cited by examiner

[Fig. 1]
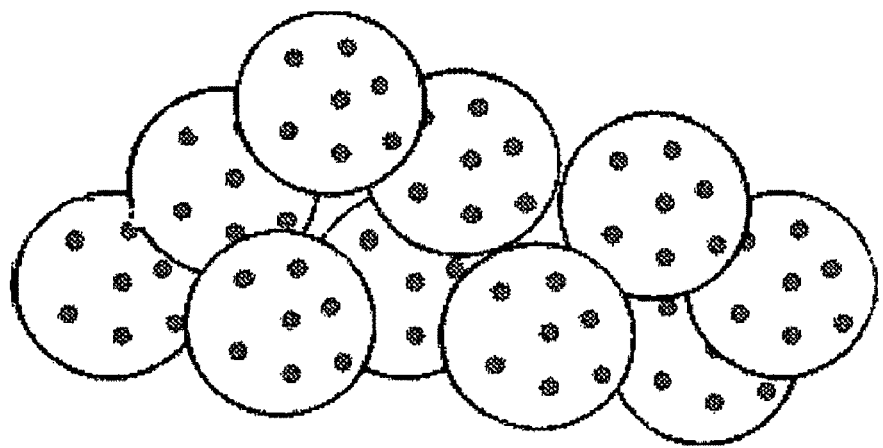
[Fig. 2]
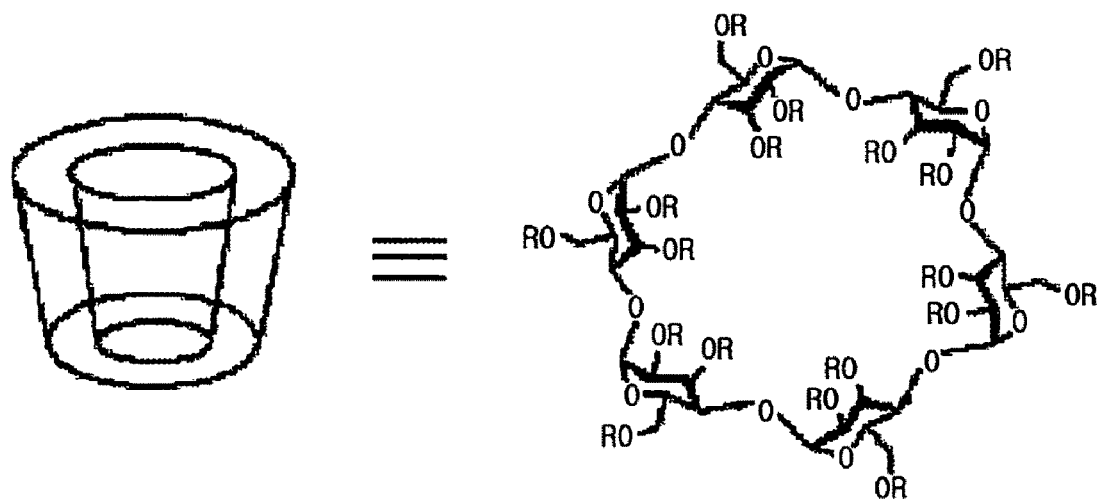

[Fig. 3]
+
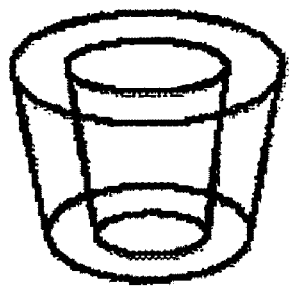

[Fig. 4]
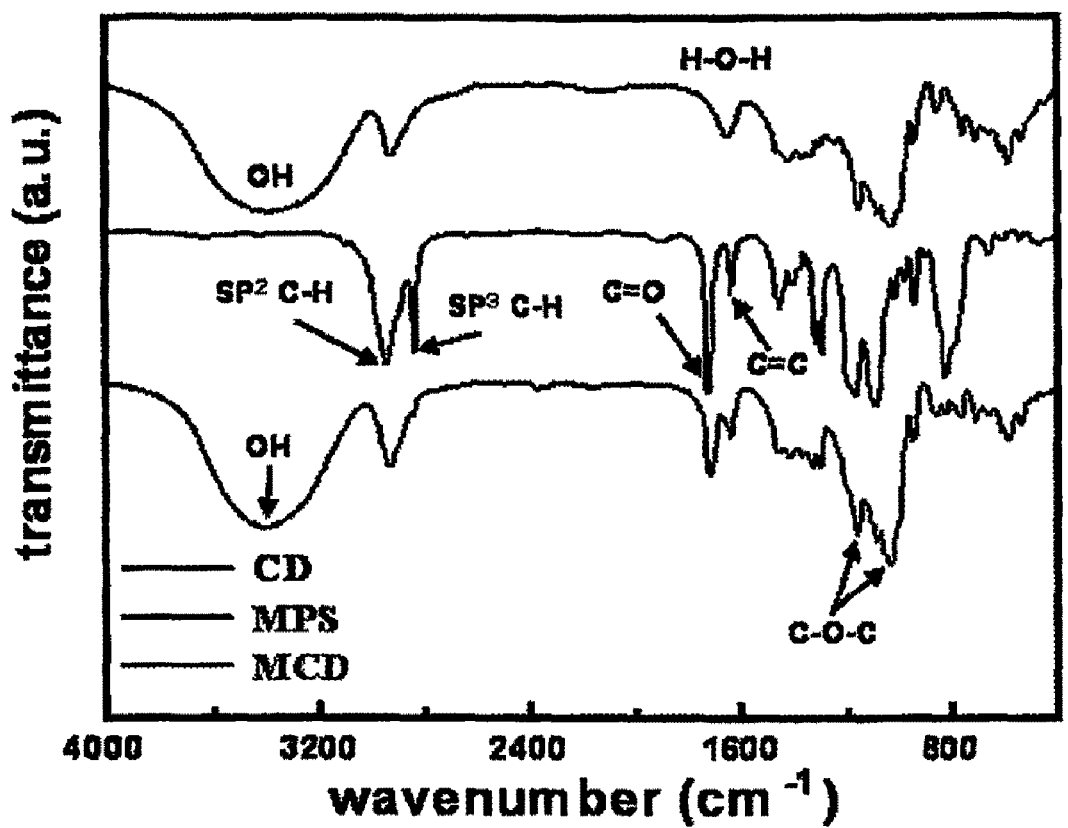

[Fig. 5]
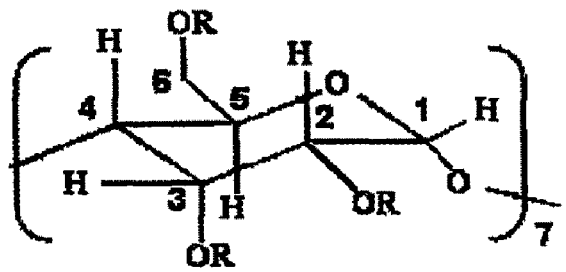
CD or MCD
R = H or
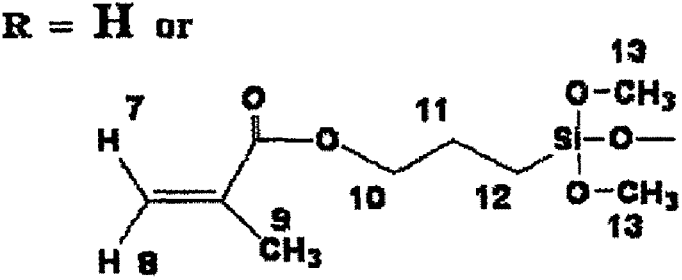
MPS
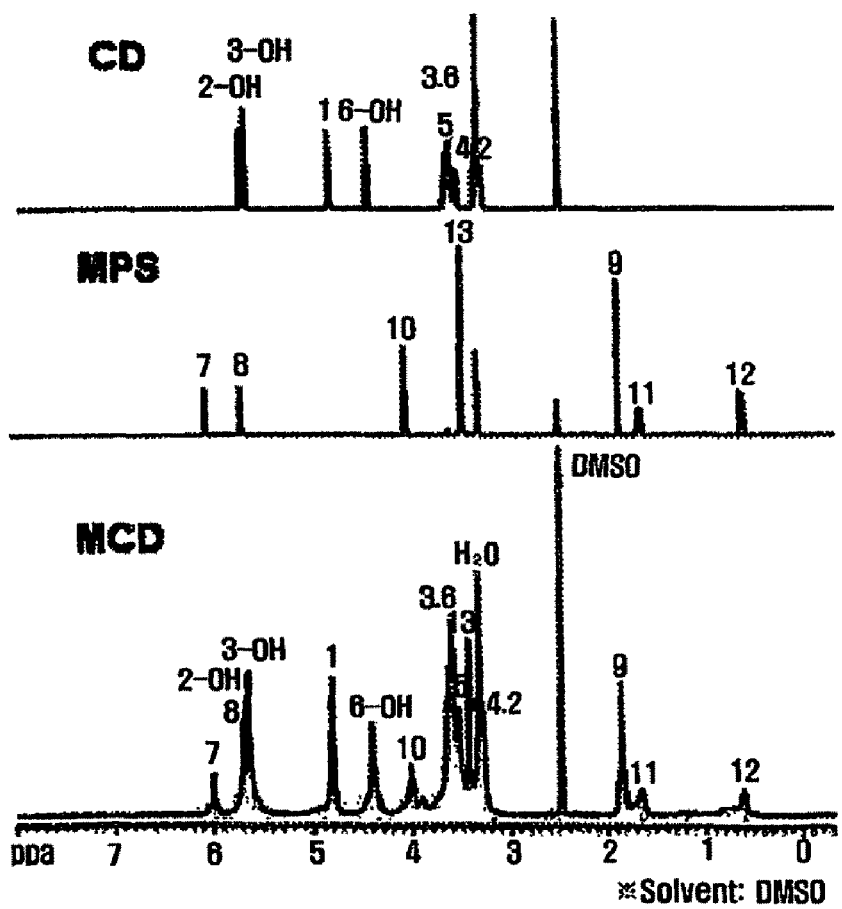
※Solvent: DMSO

[Fig. 6]
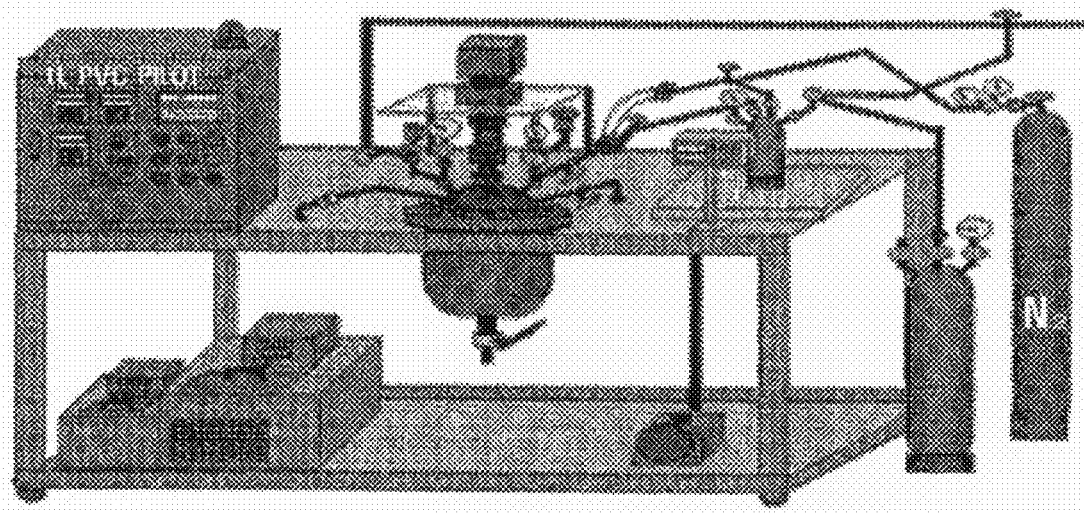

[Fig. 7]
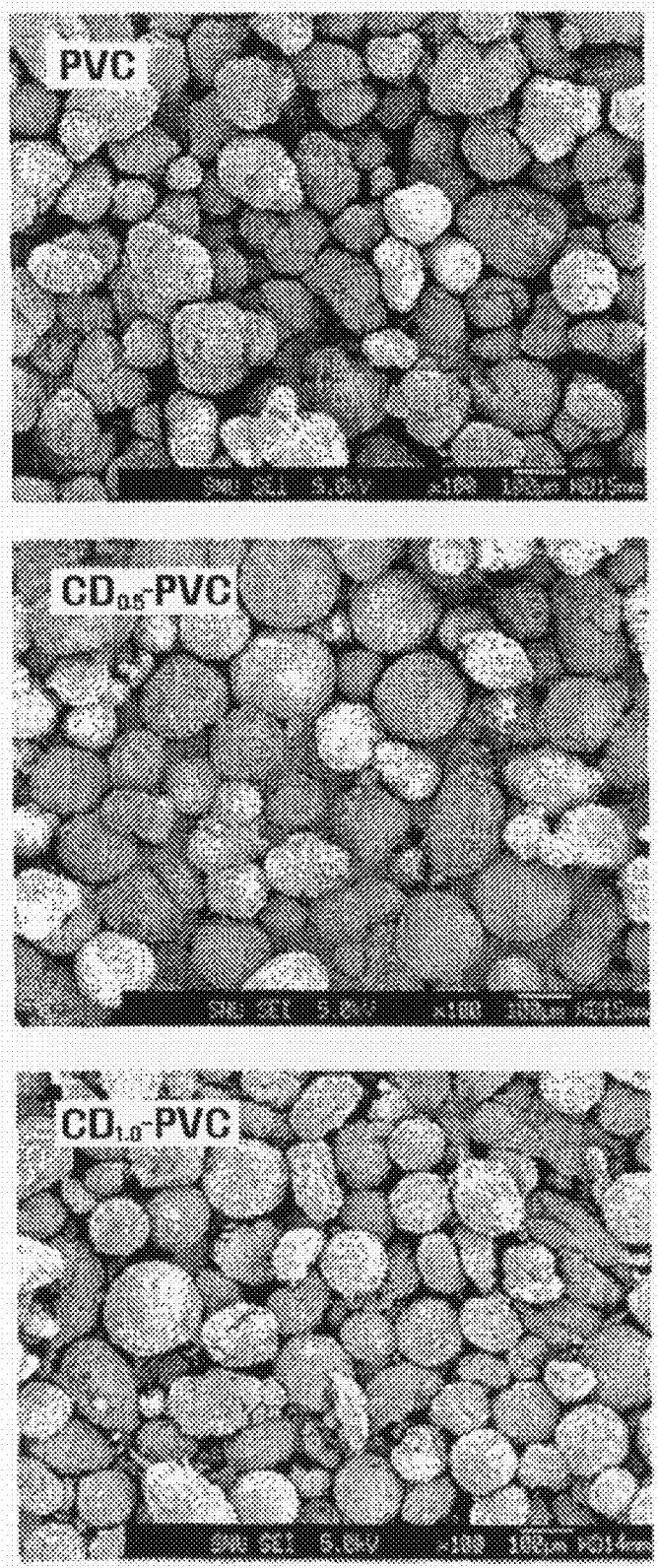

[Fig. 8]
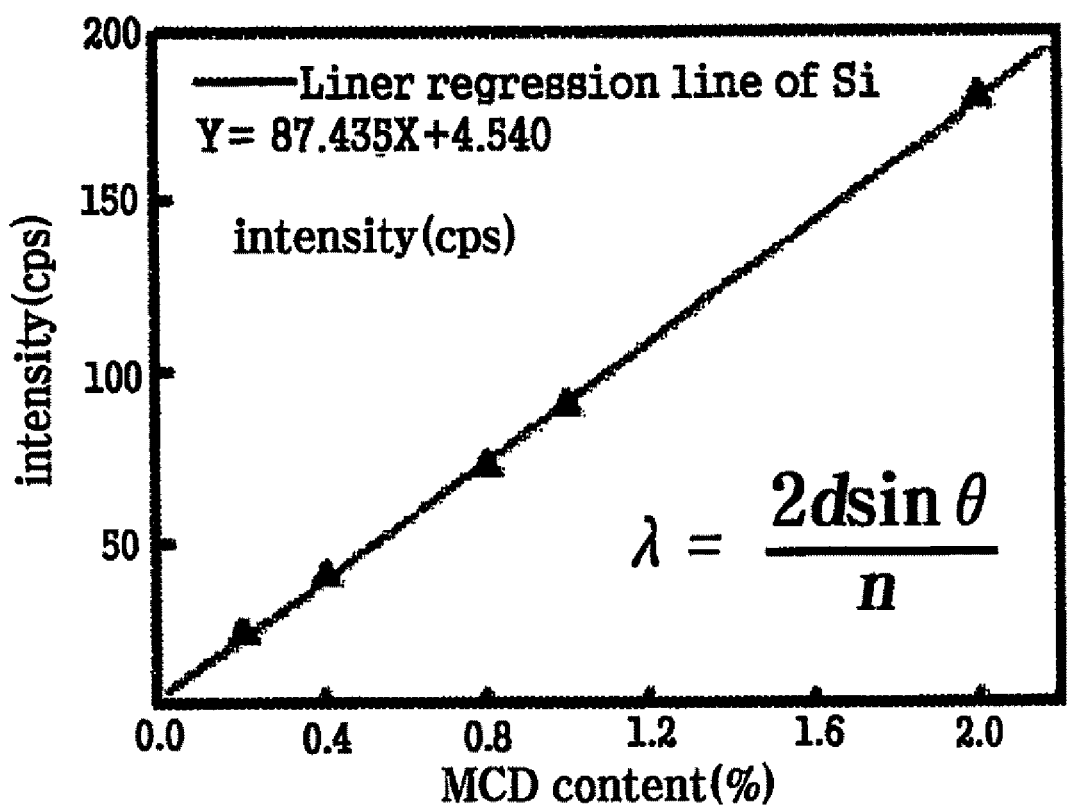

[Fig. 9]
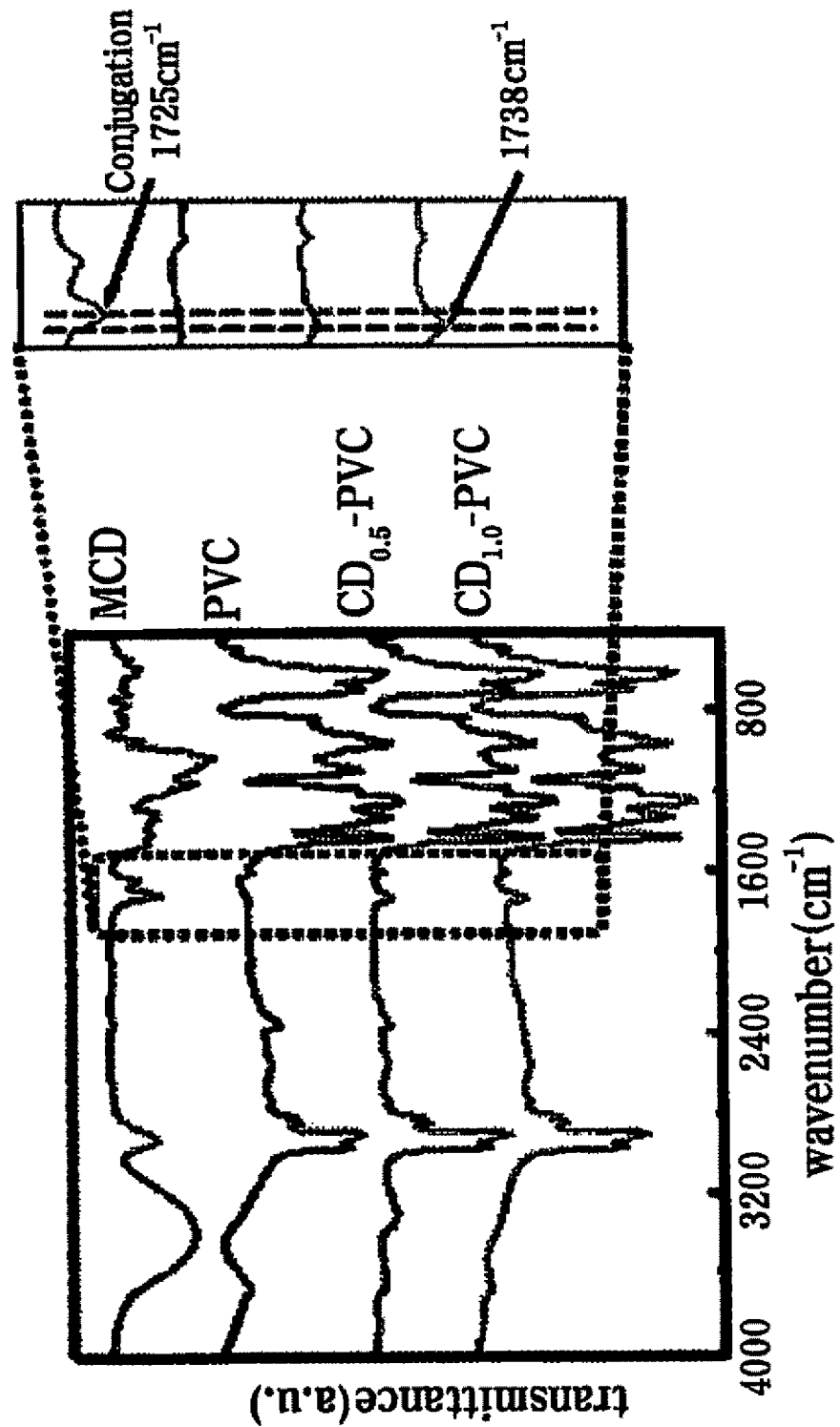

[Fig. 10]
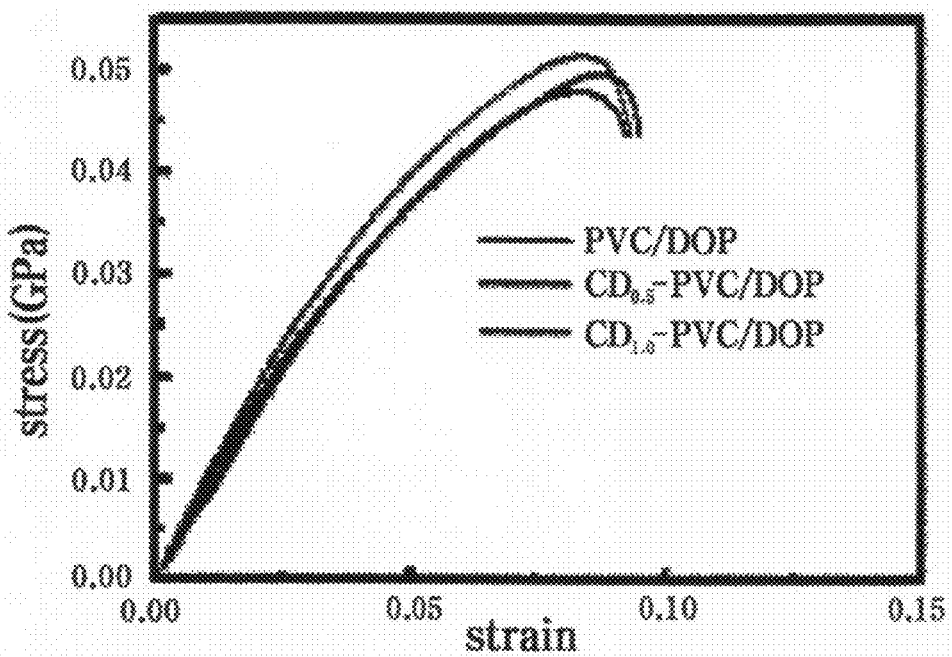
[Fig. 11]
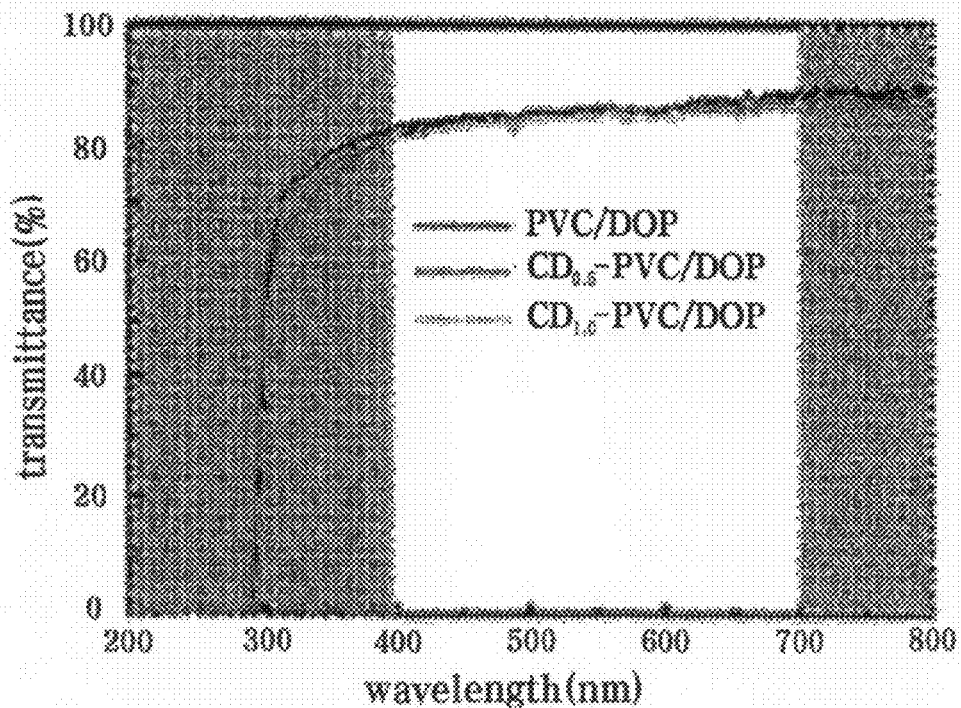

[Fig. 12]
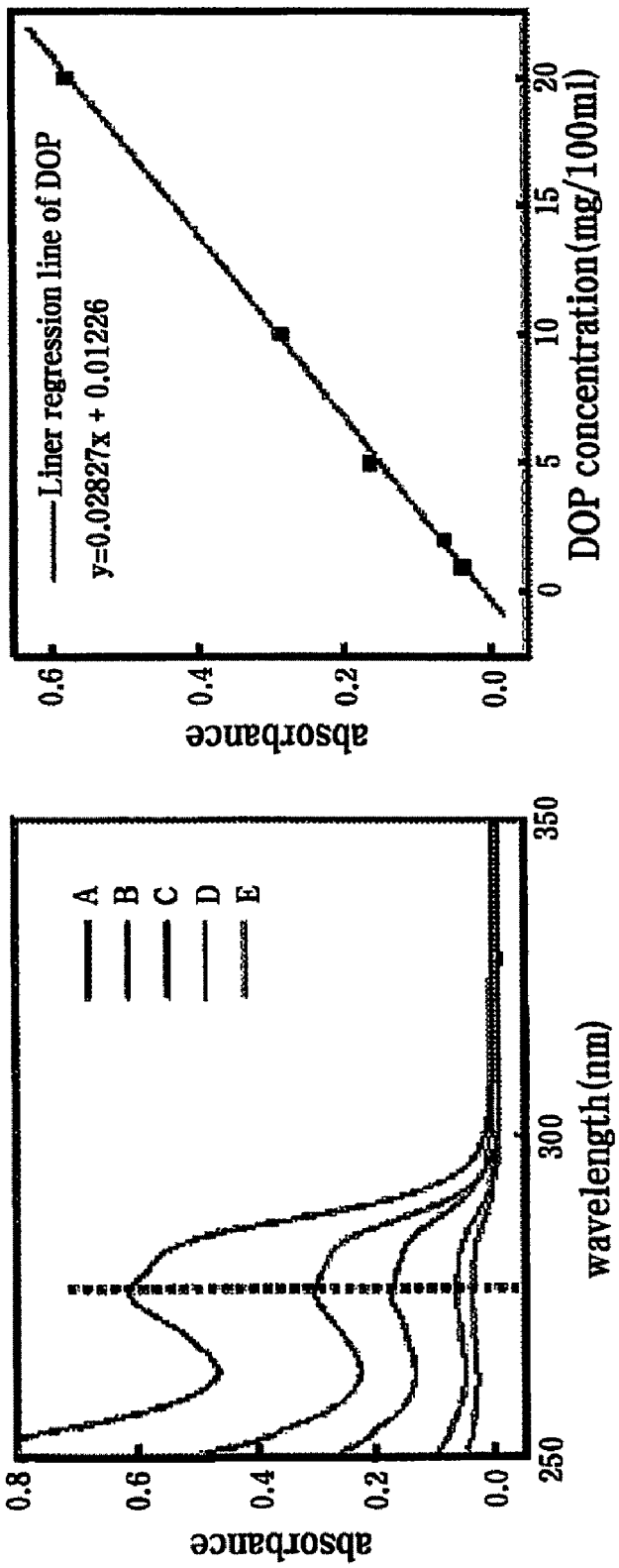

[Fig. 13]
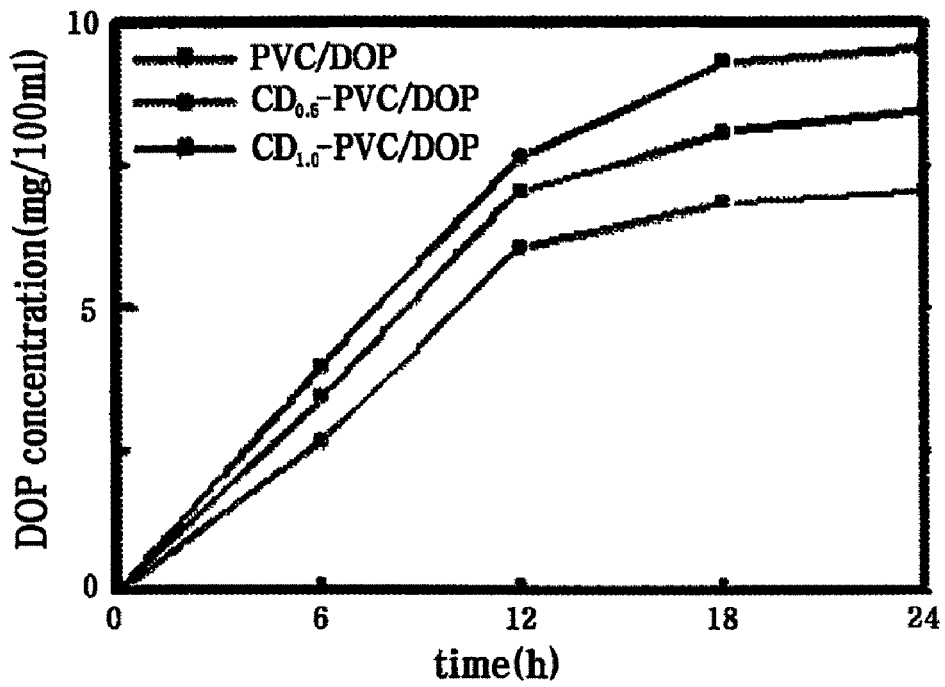
[Fig. 14]
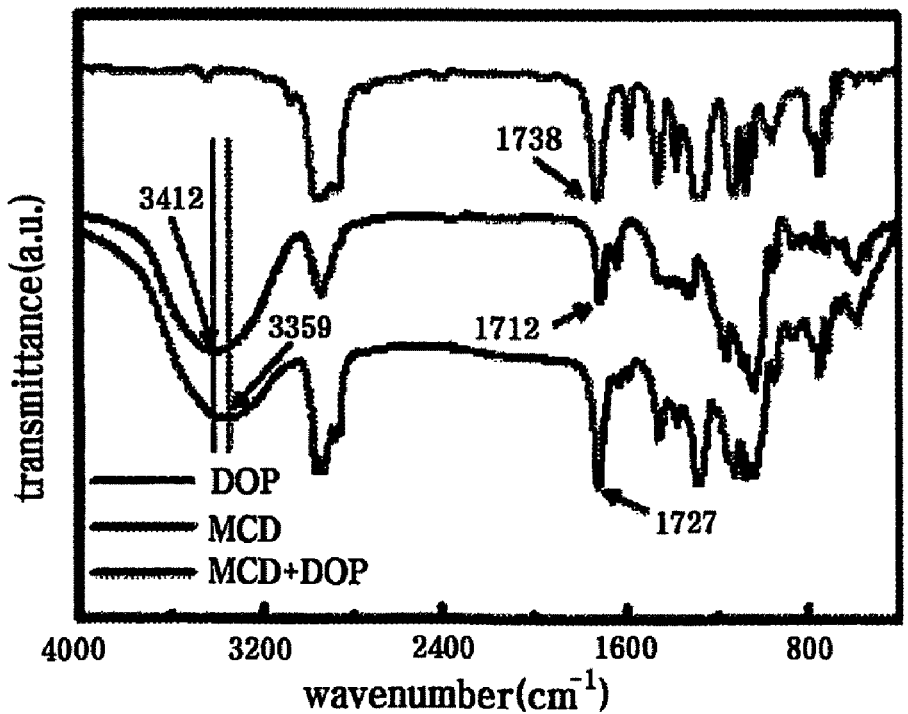

POLY(VINYL CHLORIDE) PRODUCT CONTAINING CYCLODEXTRIN DERIVATIVES WITH SUPPRESSION OF THE MIGRATION OF PLASTICIZER AND MANUFACTURING METHOD THEREOF

TECHNICAL FIELD

The present invention relates to a poly(vinyl chloride) (PVC) product manufactured by mixing PVC and a low molecular weight liquid plasticizer and a method for manufacturing the same, in particular to a PVC product capable of suppressing migration of a low molecular weight liquid plasticizer and a method for manufacturing the same.

BACKGROUND ART

Synthetic polymer products have been widely used in commodities of life and various industrial fields such as construction, medical or agricultural fields, and are increasingly used for convenience and comfort of human life. PVC is a widely used all-purpose resin, has good weatherability, waterproof capability, chemical resistance, flame resistance, electrical insulation, is relatively low-priced, and moreover, its physical, chemical and electrical properties can be controlled by use of various additives to be designable for purposes, and thus is used for various applications, for example materials for packaging various products including clothes, storage containers, construction materials, toys or a sealant for preventing opening of medicines.

PVC has a limitation in molecular mobility due to its unique hierarchy structure and microcrystallite serving as physical crosslinks, and thus a low molecular weight liquid plasticizer is additionally used to manufacture PVC products, for example a phthalate plasticizer, a phosphate plasticizer, a trimellitate plasticizer, an epoxy plasticizer or an anti-chlorine plasticizer. However, it is reported that a phthalate plasticizer, the most widely used plasticizer migrates to the surface of products when being contacted with heat and a solvent, thereby causing damage to human health and the environment, and thus, advanced nations including South Korea regulate the phthalate plasticizer as an endocrine disruptor by law, and impose legal controls on its usage amount and extent of migration.

Therefore, efforts have been made to suppress migration of a plasticizer from PVC products.

For example, there have been attempts to replace a low molecular weight liquid plasticizer with a high molecular weight plasticizer. However, the high molecular weight plasticizer has disadvantages of reduced economical efficiency, insufficient plasticization and generation of chain entanglement.

Meanwhile, it has been reported that cyclodextrin forms a complex with a low molecular weight liquid plasticizer such as dioctyl phthalate (DOP), and thus contributes to suppress migration of the plasticizer from a flexible PVC, as disclosed in Journal of Applied Polymer Science, 1996, Vol. 59, P. 2089 "Effect of blending β-cyclodextrin with poly(vinyl chlorine) on the leaching of phthalate ester to hydrophilic medium".

And, it has been reported that cyclodextrin has an inner cavity, in which lone pair exists with high density, and a phthalate plasticizer is bonded to the inner cavity with van der Waals forces, and thus migration of the plasticizer is suppressed, as disclosed in Chemical Reviews, 1998, Vo. 98, P. 1743 "Introduction and General Overview of Cyclodextrin Chemistry", and hydroxyl functional groups of an outer part of cyclodextrin may be bonded to oxygen in ester of a phthalate plasticizer by a hydrogen bond, as disclosed in Industrial & Engineering Chemistry Research, 2003, Vol. 42, P. 949 "Water Solubility Enhancement of Phthalates by Cetyltrimethylammoniym Bromide and □Cyclodextrin".

According to the above-mentioned papers, cyclodextrin of the following Chemistry Figure 2 is a cyclic compound, composed of a glucose group as a repeating unit in the same manner as α-cyclodextrin of the following Chemistry Figure 1, and has a hydrophilic outer part surrounded by hydroxyl functional groups and a hydrophobic inner cavity, and the inner cavity and the outer hydroxyl functional groups are physically and chemically bonded to a low molecular weight liquid plasticizer to form a complex, thereby suppressing migration of the plasticizer.

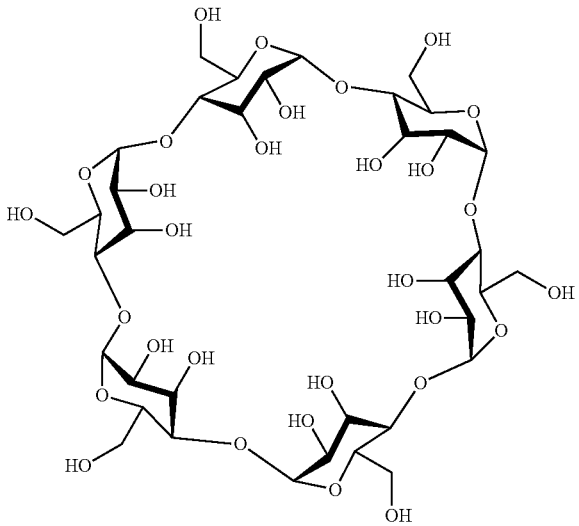

Chemistry Figure 1

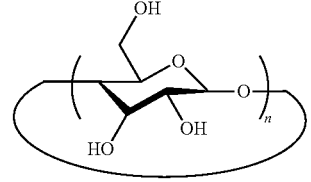

Chemistry Figure 2

To apply such properties of cyclodextrin to PVC products, conventionally cyclodextrin particles were mechanically mixed with PVC and a low molecular weight liquid plasticizer in the manufacture of PVC products. However, a simple mechanical mixing method causes a cohesion phenomenon due to low dispersibility of cyclodextrin, and consequently reduces the performance of cyclodextrin for suppressing migration of the plasticizer and deteriorates a physical property of resultant PVC products. Further, the cohesion phenomenon causes a protrusion problem during an extrusion step in processing of the PVC products. To solve the problem, the above-mentioned papers suggested to dispersing PVC, DOP and cyclodextrin in a THF solvent and cast a resultant mixture. However, this has disadvantages of low economical efficiency, unrealizable mass-production of PVC products and incomplete solution of the cohesion problem of cyclodextrin.

DISCLOSURE OF INVENTION

Technical Problem

The present invention is designed to solve the problems of the prior art, and therefore it is an object of the present invention to provide a method for manufacturing a PVC product capable of suppressing migration of a plasticizer, which may uniformly disperse cyclodextrin derivatives in the PVC product in a simple and efficient manner.

It is another object of the present invention to provide a PVC product capable of suppressing migration of a plasticizer, which has cyclodextrin derivatives dispersed uniformly therein to suppress migration of the plasticizer without deterioration of its physical property.

Technical Solution

In order to achieve the above-mentioned objects, a method for manufacturing a PVC product capable of suppressing migration of a plasticizer, comprises (S1) preparing cyclodextrin derivative particles represented by the following Chemistry Figure 3; (S2) inputting the cyclodextrin derivative particles, a water-based dispersion medium and a vinyl chloride monomer into a high-pressure reactor and performing a polymerization to obtain cyclodextrin derivative particles-capsulated PVC particles, in which a plurality of the cyclodextrin derivative particles are dispersedly capsulated in PVC particles; and (S3) mixing the cyclodextrin derivative particles-capsulated PVC particles with a low molecular weight liquid plasticizer, and molding the mixture in a predetermined shape using heat:

Chemistry Figure 3

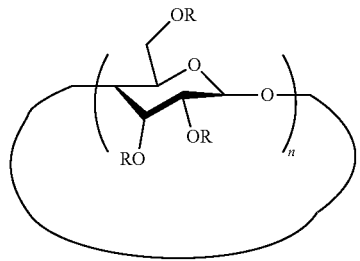

where R each is independently any one selected from the group consisting of hydrogen, a hydrocarbon functional group having 1 to 20 carbon atoms, represented by the following Chemistry Figure 4, and a silane functional group having 1 to 60 carbon atoms, represented by the following Chemistry Figure 5, and has a degree of substitution of 5 to 100%, and n is an integer from 6 to 26, Chemistry Figure 4

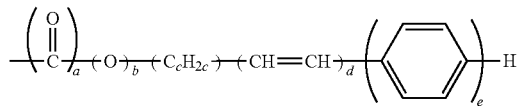

where a, b, c, d and e each is an integer of at least 0, a+b+c+c+d+e is at least 1, and a linking order between constituent units according to a, b, c, d and e is randomly changed, Chemistry Figure 5

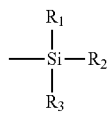

where $R_1$, $R_2$ and $R_3$ each is independently the hydrocarbon functional group having 1 to 20 carbon atoms, represented by the Chemistry Figure 4.

The manufacturing method of the present invention may allow to mass-producing a PVC product capable of suppressing migration of a plasticizer, in which cyclodextrin derivatives are uniformly dispersed in a simple and economical manner without a solvent, and considerably suppress migration of a plasticizer without deterioration of a physical property of the PVC product.

In the method for manufacturing a PVC product capable of suppressing migration of a plasticizer, the low molecular weight plasticizer may include any one or a mixture of at least one selected from the group consisting of a phthalate plasticizer, for example dimethyl phthalate (DMP), dibutyl phthalate (DBP), di-isobutyl phthalate (DIBP), dihexyl phthalate (DHP), dioctyl phthalate (DOP), diisooctyl phthalate (DIOP), dinonyl phthalate (DNP), di-isodecyl phthalate (DIDP) or benzyl butyl phthalate (BBP), an aliphatic diester plasticizer, a trimellitate plasticizer, and a phosphate plasticizer.

Further, in the method for manufacturing a PVC product capable of suppressing migration of a plasticizer, it is preferred that the cyclodextrin derivative particles have an average diameter of 1 to 50 nm, and the cyclodextrin derivative particles-capsulated PVC particles have an average diameter of 10 to 500 μm.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a diagram illustrating cyclodextrin derivative particles-capsulated PVC particles obtained in a polymerization step according to the present invention.

FIG. 2 is a schematic diagram illustrating a structure of α-cyclodextrin derivatives as an exemplary embodiment of cyclodextrin derivatives used in the present invention.

FIG. 3 is a diagram illustrating a characteristic of a complex of the cyclodextrin derivatives and a phthalate plasticizer according to the present invention.

FIG. 4 is a Fourier-transform infrared (FT-IR) spectrum of the cyclodextrin derivatives (MCD) before and after a substitution reaction according to synthetic example 2.

FIG. 5 is a $^1$H nuclear magnetic resonance (NMR) spectrum of the MCD before and after a substitution reaction according to synthetic example 2.

FIG. 6 is a diagram illustrating a pilot for producing PVC of 1 liter used in the present invention.

FIG. 7 illustrates scanning electron microscope (SEM) images of a commercial PVC, and MCD capsulated PVCs ($CD_{0.5}$-PVC, $CD_{1.0}$-PVC) produced according to the present invention.

FIG. 8 is an X-ray fluorescence (XRF) analysis graph of standard samples made by physically mixing a predetermined amount of MCD particles and a PVC compound.

FIG. 9 is an FT-IR spectrum of MCD, PVC, the $CD_{0.5}$-PVC and $CD_{1.0}$-PVC produced according to the present invention.

FIG. 10 is a strain-stress curve derived from measurement using a universal testing machine (UTM) of PVC/DOP, sample 1 ($CD_{0.5}$-PVC/DOP) and sample 2 ($CD_{1.0}$-PVC/DOP), respectively, produced by adding 8 (parts per hundred resin, phr) of low molecular weight plasticizer to a commercial PVC, and the $CD_{0.5}$-PVC and $CD_{1.0}$-PVC produced according to the present invention.

FIG. 11 is a UV/vis. spectrum of transmittance of the PVC/DOP, sample 1 ($CD_{0.5}$-PVC/DOP) and sample 2 ($CD_{1.0}$-PVC/DOP).

FIG. 12 is calibration curve of a standard solution made by adding a predetermined amount of DOP to a migration solution prepared based on International Organization for Standard (ISO) 3826.

FIG. 13 is a graph illustrating DOP concentration of the PVC/DOP, sample 1 and sample 2 according to time.

FIG. 14 is an FT-IR spectrum of DOP, MCD, and MCD+DOP, i.e. a complex of MCD and DOP.

BEST MODE FOR CARRYING OUT THE INVENTION

Hereinafter, a method for manufacturing a PVC product capable of suppressing migration of a plasticizer will be described in detail with reference to the accompanying drawings.

First, cyclodextrin derivative particles represented by the following Chemistry Figure 3 are prepared (S1).

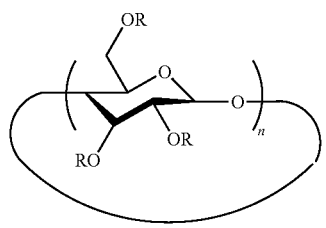

<Chemistry Figure 3> where R each may be independently hydrogen, a hydrocarbon functional group having 1 to 20 carbon atoms, represented by the following Chemistry Figure 4, or a silane functional group having 1 to 60 carbon atoms, represented by the following Chemistry Figure 5. n is an integer of 6 to 26, and preferably 6 to 8. The R has a degree of substitution of 1 to 100%, and preferably 5 to 50%, and the degree of substitution is calculated according to the following Math Figure 1.

Substitution Degree =

$$\left( \frac{\text{Total No. of Substituted Hydroxy Group}}{\text{Total No. of Hydroxy Group in Cyclodextrin}} \right) \times 100(\%)$$

Math Figure 1

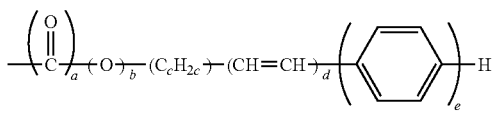

<Chemistry Figure 4> where a, b, c, d and e each is an integer of at least 0, and a+b+c+d+e is at least 1. A linking order between constituent units according to a, b, c, d and e is not limited to the Chemistry Figure 4, and may be randomly changed. The hydrocarbon functional group represented by the Chemistry Figure 4 may include methyl, ethyl, butyl, octyl, decyl, hexadecyl, aryl, phenyl or benzyl; however the present invention is not limited in this regard.

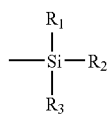

<Chemistry Figure 5> where $R_1$, $R_2$ and $R_3$ each is independently a hydrocarbon functional group having 1 to 20 carbon atoms, represented by the Chemistry Figure 4. A silane functional group represented by the Chemistry Figure 5 may include trimethyl silane, butyldimethyl silane, methoxy silane, ethoxy silane or methacryloxypropyl trimethoxy silane, however the present invention is not limited in this regard.

Such cyclodextrin derivatives may be produced by modificating the cyclodextrin represented by the Chemistry Figure 2 with a compound represented by the following Chemistry Figure 6.

R-X   Chemistry Figure 6 where R is the same as R of the Chemistry Figure 3, and X is a functional group that may react with the hydroxyl functional group of the cyclodextrin represented by the Chemistry Figure 2, and may include, for example a halogen atom, a hydroxyl functional group or an alkoxy functional group. A hydrogen atom in the hydroxyl functional group of the cyclodextrin is replaced by R in a substitution reaction. A degree in which the hydrogen atom is replaced by R, i.e. the degree of substitution may be controlled according to an input mole ratio of the compound represented by the Chemistry Figure 6 during the substitution reaction.

Subsequently, the prepared cyclodextrin derivative particles, a water-based dispersion medium and a vinyl chloride monomer are input into a high-pressure reactor and performed a polymerization reaction to obtain cyclodextrin derivative particles-capsulated PVC particles, in which a plurality of the cyclodextrin derivative particles are dispersedly capsulated in PVC particles (S2).

The step S2 may use a suspension polymerization method, i.e. a conventional heterogeneous polymerization method, and thus utilize conventional equipment without a procedural change, thereby saving additional equipment investment costs in an aspect of economical efficiency. A step for obtaining the cyclodextrin derivative particles-capsulated PVC particles using the suspension polymerization method is described in detail as follows.

First, a water-based dispersion medium, cyclodextrin derivatives and additives, for example a surfactant, an initiator and a buffer are input into a high-pressure reactor, vacuum is applied to remove oxygen in the reactor, a vinyl chloride monomer is further input into the reactor, and after sufficient agitation of the reactor, the mixture is heated up to a reaction temperature for polymerization.

At this time, according to a method for inputting reactants of a polymerization, in which reactants are simultaneously input into a reactor, a dropping monomer method, in which a monomer is continuously or divisionally input into a reactor or a dropping suspension method, in which a portion of reactants is initially input into a reactor and the rest is continuously or divisionally input into the reactor at the same time with progress of reaction, however the present invention is not limited in this regard.

The water-based dispersion medium may include, for example water only or a mixture of water and a water-soluble organic solvent (for example, methanol, ethanol, isopropanol or acetone). In the case of the mixture of water and a water-soluble organic solvent, if the organic solvent is excessively contained, a dispersion system of a reactant dispersion solution may be destructed, and thus it is preferred that the organic solvent is contained not more than 70 wt % in the water-based dispersion medium.

And, the surfactant enables the vinyl chloride monomer to form stable droplets in the water-based dispersion medium, and thus it is preferred to use a surfactant, of which one end contains a hydrophobic group having good miscibility with the vinyl chloride monomer and the other end contains a hydrophilic group having good miscibility with the dispersion medium. For example, the surfactant may include a vinyl acetate-maleic anhydride copolymer, ester of fatty acid, pentaerythritol, a mixture of cellulose ether and polyvinyl acetate or polyvinyl alcohol, polyvinyl pyrrolidone, vinyl acetate, gelatin or starch, and use at least one kind according to desired size, distribution and yield of the cyclodextrin derivative particles-capsulated PVC particles.

And, the initiator may include an organic peroxide, for example benzoyl peroxide, cumyl hydroperoxide, propionyl peroxide, lauryl peroxide or acetyl peroxide, or an azo-based initiator such as azo isobutyronitrile, which is soluble to the monomer, and its usage amount is preferably 0.1 to 5 wt % based on 100 wt % of the vinyl chloride monomer.

The cyclodextrin derivatives of the Chemistry Figure 3, in which the hydroxyl functional group is replaced by a predetermined compound, has better affinity with the vinyl chloride monomer than with the water-based dispersion medium, in different way from the cyclodextrin derivatives of the Chemistry Figure 2. Thus, the cyclodextrin derivatives of the Chemistry Figure 2 do not permeate into vinyl chloride monomer droplets, and it is difficult to obtain desired capsulated PVC particles, whereas the cyclodextrin derivative particles of the Chemistry Figure 3 permeate into vinyl chloride monomer droplets, thereby obtaining the 'cyclodextrin derivative particles-capsulated PVC particles', in which the cyclodextrin derivative particles are dispersedly capsulated in the PVC particles.

In the step S2 of the present invention, the particle size of the obtained cyclodextrin derivative particles-capsulated PVC particles may be controlled according to process conditions, and for example, the average diameter may be controlled preferably in the range of 10 and 500 μm, and more preferably in the range of 50 and 200 μm. And, the average diameter and content of the cyclodextrin derivative particles may be controlled within the range of not destroying the object of the present invention, and the average diameter of the cyclodextrin derivative particles may be controlled preferably in the range of 1 and 50 nm, and more preferably in the range of 1 and 5 nm, and the content of the cyclodextrin derivative particles may be controlled preferably in the range of 0.1 and 5 wt % (based on the total weight of the cyclodextrin derivative particles-capsulated PVC particles). When the cyclodextrin derivative particles-capsulated PVC particles are produced using a suspension polymerization method of an organic nanoparticles-capsulated PVC according to the present invention, the reaction temperature is determined by a thermal decomposition temperature of the initiator, and generally the thermal decomposition temperature is preferably in the range of 40 and 90° C.

FIG. 1 is a diagram illustrating the cyclodextrin derivative particles-capsulated PVC particles obtained in the step S2 of the present invention. Referring to FIG. 1, a plurality of the cyclodextrin derivative particles are dispersedly capsulated in each of the PVC particles.

The cyclodextrin derivative particles-capsulated PVC particles obtained by the above-mentioned method are mixed with a low molecular weight liquid plasticizer, and the mixture is molded in a predetermined shape by heat, thereby manufacturing a PVC product (S3).

The cyclodextrin derivative particles are dispersed in the cyclodextrin derivative particles-capsulated PVC particles, and accordingly the cyclodextrin derivative particles are uniformly dispersed in the PVC product manufactured using the cyclodextrin derivative particles-capsulated PVC particles, thereby sufficiently performing a unique function for suppressing migration of the low molecular weight liquid plasticizer. That is, the manufacturing method of the present invention disperses the cyclodextrin derivatives in the PVC particles beforehand in a PVC polymerization step to improve dispersion of the cyclodextrin in the PVC product, and thus may suggest a solution to a dispersion problem of a conventional method, which mechanically mixes cyclodextrin particles mixed with PVC particles.

In the method for manufacturing a PVC product capable of suppressing migration of a plasticizer according to the present invention, the low molecular weight plasticizer may include any one or a mixture of at least one selected from the group consisting of a phthalate plasticizer, for example dimethyl phthalate (DMP), dibutyl phthalate (DBP), di-isobutyl phthalate (DIBP), dihexyl phthalate (DHP), dioctyl phthalate (DOP), diisooctyl phthalate (DIOP), dinonyl phthalate (DNP), di-isodecyl phthalate (DIDP) or benzyl butyl phthalate (BBP), an aliphatic diester plasticizer, for example dioctyl adipate (DOA), diisooctyl adipate (DIOA) or diisodecyl adipate (DIDA), a trimellitate plasticizer, for example tri-isooctyl trimellitate (TIOTM), or a phosphate plasticizer, for example tri-tolyl phosphate (TTP) or trixylyl phosphate (TXP). A mixing ratio of PVC and the low molecular weight plasticizer may be controlled according to the desired degree of ductility, which is apparent to an ordinary person in the art, and generally, 10 to 80 mols of plasticizer is added based on 100 mols of PVC, however the present invention is not limited in this regard.

In the above-mentioned step S3, a heating temperature is such an extent to mold the cyclodextrin derivative particles-capsulated PVC particles and low molecular weight liquid plasticizer in a desired shape, and thus may be higher than a melting temperature of PVC and higher than a softening temperature of PVC, which is lower than the melting temperature of PVC. And, the cyclodextrin derivative particles-capsulated PVC particles may be further mixed with typical PVC particles not containing the cyclodextrin derivative particles within the range of not destroying the object of the present invention, which is apparent to an ordinary person in the art.

A PVC product capable of suppressing migration of a plasticizer obtained according to the above-mentioned manufacturing method is manufactured by molding a mixture in a predetermined shape using heat, the mixture comprising (a) a plurality of cyclodextrin derivative particles-capsulated PVC particles including the PVC particles and the cyclodextrin derivative particles represented by the Chemistry Figure 3 being dispersedly capsulated in the PVC particles; and (b) a low molecular weight liquid plasticizer. Preferably, the content of the cyclodextrin derivative particles is 0.1 to 5 wt % based on the total weight of the flexible PVC product capable of suppressing migration of a plasticizer.

In the PVC product capable of suppressing migration of a plasticizer according to the present invention, the principle of suppressing migration of a low molecular weight liquid plasticizer is described as follows.

FIG. 2 is a schematic diagram illustrating a structure of α-cyclodextrin derivative as an exemplary embodiment of cyclodextrin derivatives used in the present invention. Referring to FIG. 2, α-cyclodextrin derivatives have an inner cavity. Such cyclodextrin derivatives draw a low molecular weight liquid plasticizer, for example DOP into the cavity or forms a complex with the low molecular weight liquid plasticizer by a chemical bond such as a hydrogen bond, thereby suppressing migration of the low molecular weight liquid plasticizer (see FIG. 3).

Hereinafter, preferred embodiments of the present invention will be described in detail with reference to the accompanying drawings. However, the description proposed herein is just a preferable example for the purpose of illustrations only, not intended to limit the scope of the invention, so it should be understood that other equivalents and modifications could be made thereto without departing from the spirit and scope of the invention. The preferred embodiments of the present invention will be described in detail for the purpose of better understandings, as apparent to a person having ordinary skill in the art.

SYNTHETIC EXAMPLE 1

In this synthetic example 1, β-cyclodextrin is reacted with benzyl chloride to synthesize cyclodextrin derivatives represented by the following Chemistry Figure 7.

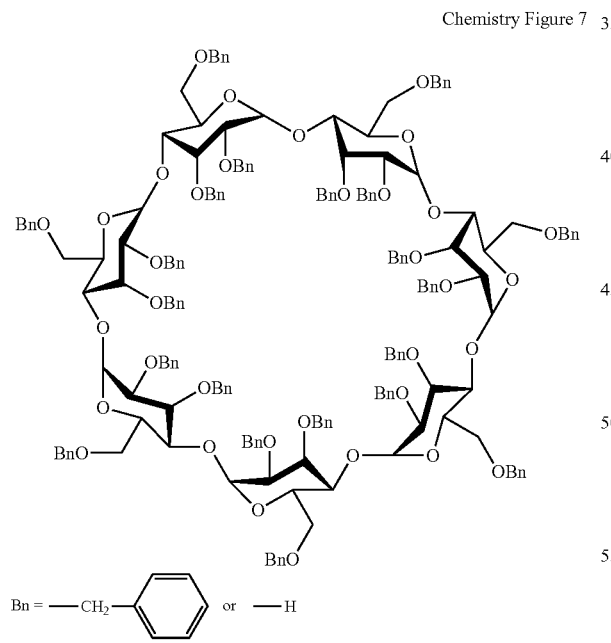

Chemistry Figure 7

2,3,6-tri-O-benzyl-β-cyclodextrin (hereinafter, referred to as "Bn-β-CD") represented by the Chemistry Figure 7 is synthesized according to a method disclosed in the paper [Carbohydrate Research 1990, Vol. 199, P. 31-35 "Synthesis of 1,4-anhydro-2,3,6-tri-O-benzyl-α-D-glucopyranose by cis-ring-closure of a glycosyl chloride"].

The β-cyclodextrin used in a reaction is purchased from Tokyo Kasei. 5.0 g of β-cyclodextrin is dissolved in 250 ml of dimethylsulfoxide (DMSO). Next, 3 g of sodium hydride (NaH) is uniformly dispersed in 50 ml of DMSO, mixed with the previously prepared β-cyclodextrin solution and stirred at room temperature. Subsequently, 14 ml of benzyl chloride is slowly added to the stirred mixture, and after 6 hours, a precipitate is obtained using water. The precipitate is dissolved in acetone, impurities are removed from the precipitate, and the impurities-free precipitate is dried to obtain a product containing Bn-β-CD. The dissolution and precipitation steps are repeated using acetone and methanol to obtain a more purified product.

The Bn-β-CD product obtained through the above-mentioned process is performed an elementary analysis for carbon, hydrogen, oxygen atoms to calculate a weight ratio of each atom, and a result is listed in the following Table 1.

On the basis of the result, it is calculated how much hydrogen in a terminal hydroxyl functional group of the β-cyclodextrin is replaced, and it is revealed that 19 (about 90.5%) hydroxyl functional groups of the total 21 hydroxyl functional groups of the β-cyclodextrin are replaced in the reaction with benzyl chloride.

TABLE 1

| Atoms | Carbon | Hydrogen | Oxygen |
|---|---|---|---|
| % by weight | 72.1979 | 6.3808 | 19.2859 |

SYNTHETIC EXAMPLE 2

In this synthetic example, β-cyclodextrin is reacted with 3-trimethoxysilylpropylmethacrylate (MPS) represented by the following Chemistry Figure 8 to synthesize cyclodextrin derivatives represented by the following Chemistry Figure 9.

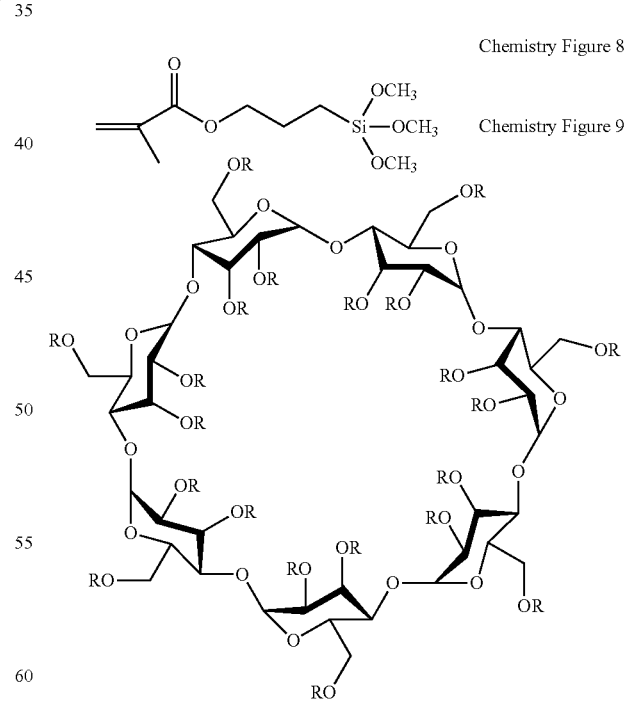

Chemistry Figure 8

Chemistry Figure 9

The cyclodextrin derivative of the Chemistry Figure 9 is synthesized by the following method.

Prior to a modification process of the β-cyclodextrin, moisture is completely removed from the β-cyclodextrin using a Dean-Stock apparatus. A reflux tube and a nitrogen inlet are installed in a 3-neck flask, first 250 ml of N,N-dimethylformamide, and then 15 g of β-cyclodextrin are input into the 3-neck flask and sufficiently stirred for complete dissolution. And, the inside of the 3-neck flask is made to a vacuum state, nitrogen is applied to the 3-neck flask, 15 ml of 3-trimethoxysilylpropylmethacrylate (MPS) is input into the 3-neck flask, and kept for 48 hours at a constant temperature of 80 to 100° C. for reaction. Subsequently, dimethylformamide is removed from the reaction solution through a column, and a precipitate is obtained using acetone, and dried for a day under a vacuum condition.

FIG. 4 is an FT-IR spectrum of the β-cyclodextrin before and after the substitution reaction according to the synthetic example 2, and FIG. 5 is NMR spectrum of the β-cyclodextrin before and after the substitution reaction according to the synthetic example 2. As shown in FIG. 4, it is revealed that as MPS is reacted with cyclodextrin (CD) before the substitution reaction, MPS is bonded through introduction of a vinyl functional group of the wavenumber of about 1650 $cm^{-1}$ which exists only in MPS, and as shown in FIG. 5, it is confirmed from NMR spectrum that after the substitution reaction, 10% of hydroxyl functional group is replaced by MPS through a ratio of area between a hydrogen group of the vinyl functional group and a unreacted hydroxyl functional group.

SYNTHETIC EXAMPLE 3

This synthetic example shows a method for producing cyclodextrin derivative particles-capsulated PVC particles using a suspension polymerization method, and the cyclodextrin derivatives (MCD) produced in the synthetic example 2 are used as cyclodextrin derivative particles. Additives used in the synthetic example 3 are listed in the following table 2. A vinyl chloride monomer is a product made by Hanwha Chemical Corporation. The vinyl chloride monomer is in a gas state at an atmosphere pressure, and thus requires a high-pressure process to change gas to liquid, and polymerization is performed using a pilot reactor (see FIG. 6) made from stainless steel and capable of high-pressure reaction and temperature control. First, distilled water, a suspension, a scale preventer, an initiator, an antioxidant and MCD (an average diameter: 3 nm) are input into a high-pressure reactor, and vacuum is applied. Next, a vinyl chloride monomer is input into the high-pressure reactor, and the reactor is closed to an airtight state. Polymerization is performed with 600 to 700 rpm for 5 hours under temperature of about 57.5±0.5° C. and pressure of 9 Kg/☐G. When pressure falls from a parallel state to 0.5 Kg/☐G, the obtained reactant mixture is suction filtrated to separate a solid product, and the solid product is cleansed, filtrated and dried to obtain β-cyclodextrin particles-capsulated PVC powder. The prepared β-cyclodextrin particles-capsulated PVC powder is referred to as $CD_x$-PVC, and x is a weight percentage of MCD to the whole mass of the vinyl chloride monomer added during a PVC polymerization step. The initiator used in the suspension polymerization is 1,1,3,3,-tetramethylbutylperoxyneodecanoate (OPP) and di-2-ethylhexylperoxydicarbonate (BND), and the suspension is polyvinyl alcohol (PVA).

TABLE 2

| Classification | | Content |
|---|---|---|
| Dispersion Medium | Deionized Water | 397 mL |
| Monomer | Vinyl Chloride | 248 g |
| Organic Nanoparticles | MCD | 1.23 g($CD_{0.5}$-PVC) |
| | | 2.47 g($CD_{1.0}$-PVC) |

TABLE 2-continued

| Classification | | Content |
|---|---|---|
| First Initiator | BND | 0.113 g |
| Second Initiator | OPP | 0.113 g |
| Suspension | PVA | 5.95 g |

Evaluation of Morphology of the Compound $CD_x$-PVC

FIG. 7 illustrates SEM images of a commercial PVC (made by Hanhwa, P-1000) having the degree of polymerization of 1,000, and $CD_{0.5}$-PVC and $CD_{1.0}$-PVC, i.e. cyclodextrin nanoparticles-capsulated PVCs produced according to the present invention. According to the SEM images, the compound powder has a size of about 150 μm which is similar to the size of the commercial PVC.

Determination of the Content of Cyclodextrin Derivatives of the Compound $CD_x$-PVC XRF analysis is used to calculate the content of cyclodextrin derivatives (MCD) of the compound $CD_x$-PVC produced in the synthetic example 3. XRF calculates components and their contents of a material using fluorescence that is generated by filling a vacancy excited by radiation of X-ray with other electrons.

Prior to XRF analysis, the content of 0.2, 0.4, 0.8, 1.0 and 2.0% of MCD each is physically mixed with a commercial PVC, and as shown in FIG. 8, a calibration curve about the content of Si in the MCD is prepared using XRF according to the content of MCD. The composition of a standard sample for a calibration curve is listed in Table 3.

Next, XRF analysis is performed on $CD_{0.5}$-PVC and $CD_{1.0}$-PVC, and the content of MCD is calculated using the previously prepared calibration curve. Therefore, as shown in Table 4, it is revealed that $CD_{0.5}$-PVC contains 0.560 wt % of MCD, and $CD_{1.0}$-PVC contains 1.056 wt % of MCD.

TABLE 3

| | Commercial PVC | MCD content |
|---|---|---|
| 0% | 5.00 g | 0.00 g |
| 0.2% | 4.99 g | 0.01 g |
| 0.4% | 4.98 g | 0.02 g |
| 0.8% | 4.96 g | 0.04 g |
| 1.0% | 4.95 g | 0.05 g |
| 2.0% | 4.90 g | 0.10 g |

TABLE 4

| | Stress(cps) | Content(%) |
|---|---|---|
| $CD_{0.5}$-PVC | 53 | 0.560 |
| $CD_{1.0}$-PVC | 97 | 1.056 |

Evaluation of Change of Chemical Structure According to Production of the Compound $CD_x$-PVC To evaluate the change of a chemical structure according to production of the compound $CD_x$-PVC, as shown in FIG. 9, FT-IR analysis is performed on MCD before a reaction and $CD_x$-PVC after a reaction. With regard to an ester functional group, MCD has a vinyl functional group in carbon adjacent to ester, and thus resonance may occur to exhibit C═O at the wavenumber of 1725☐ However, it is revealed that in the case of $CD_x$-PVC, peak moves to the wavenumber of 1738☐, which it is judged, according to formation of $CD_x$-PVC, the vinyl functional group of MCD participates in a reaction to change the chemical structure to a single bond, thereby resulting in failure of a resonance structure, and as a result, peak moves to higher wavelength.

EXAMPLE 1

This example shows a method for manufacturing a PVC product, in which the capsulated PVC($CD_x$-PVC) produced in the synthetic example 3 is mixed with a low molecular weight liquid plasticizer, and the mixture is molded by heat.

The plasticizer is a typical low molecular weight liquid plasticizer, for example diocthyl phthalate (hereinafter referred to as DOP). A heat stabilizer is MT-800 made by Song-Won Industrial Co. Ltd.

Samples of this example 1 are prepared using components listed in Table 5. The unit of Table 5 is weight percentage.

The samples are prepared by the following method. First, sample 1 and sample 2 uses the $CD_{0.5}$-PVC polymer and $CD_{1.0}$-PVC polymer produced in the synthetic example 3, respectively, and sample 3 uses a commercial PVC polymer. The $CD_{0.5}$-PVC polymer used in the sample 1 is a capsulated PVC containing 0.5 wt % of cyclodextrin derivative particles to 100 wt % of a vinyl chloride monomer, and the $CD_{1.0}$-PVC polymer used in the sample 2 is capsulated PVC containing 1 wt % of cyclodextrin derivative particles to 100 wt % of a vinyl chloride monomer. As shown in Table 5, the PVC polymers each is mixed with a plasticizer and a heat stabilizer by an internal mixer with an agitation speed of 60 rpm under a temperature of 160° C. for about 10 min, and pressed by a presser of 170° C. under pressure of 4250 psi for 10 min, so that the samples having a predetermined thickness are prepared.

TABLE 5

| | Classification | | |
|---|---|---|---|
| | Sample 1 ($CD_{0.5}$-PVC/DOP) | Sample 2 ($CD_{1.0}$-PVC/DOP) | Sample3 (PVC/DOP) |
| Used vinyl-based polymer | $CD_{0.5}$-PVC 70.35 g | $CD_{1.0}$-PVC 70.70 g | Commercial PVC 70.00 g |
| Plasticizer | | 5.600 g | |
| Heat Stabilizer | | 2.100 g | |

Evaluation of Change of Mechanical Properties

Mechanical properties of the samples 1, 2 and 3 prepared in the example 1 are evaluated. On the basis of ASTM-D638M, the samples are put in a frame, applied by pressure, and tensed using a universal testing machine (UTM) with load cell of 1,000N and speed of 10 □/min, and compared to each other, thereby evaluating their mechanical properties.

A result of the chemical properties is shown in FIG. 10 and Table 6, and it is revealed that even though cyclodextrin derivative particles are capsulated, mechanical properties of the samples hardly change.

TABLE 6

| | Initial Modulus of Elasticity(GPa) | Maximum Tension(MPa) |
|---|---|---|
| Sample 1 | 1.031 | 49.66 |
| Sample 2 | 1.099 | 51.51 |
| Sample 3 | 0.885 | 47.92 |

Evaluation of Change of Optical Properties

To evaluate optical properties of the samples, the samples 1, 2 and 3 prepared in the example 1 each is formed of a film having a thickness of 0.4 mm, and their transmittance is analyzed through UV/vis. spectroscopy analysis. The transmission spectrum is illustrated in FIG. 11, and it is evaluated that capsulation of cyclodextrin derivative particles does not influence the transmittance.

Evaluation of Migration of Plasticizer

The samples prepared in the example 1 are tested for migration of a plasticizer using the below-mentioned method. The migration test is carried out in conformity with conditions based on a method of ISO (International Standard Organization) 3826 "Plastics collapsible containers for human blood and blood components".

First, to determine the DOP concentration, various concentrations of standard DOP solutions are prepared through the below-mentioned process, and a calibration curve is plotted by measuring the absorbance of the standard DOP solutions at the wavelength of 272 nm using a UV-vis. spectrophotometer.

The standard DOP solutions each is prepared with the contents of 1, 2, 5, 10 and 20 mg of DOP based on 100 ml of a mixed ethyl alcohol/water solution used in the DOP migration test, and its preparing method is described in detail, as follows.

A migration solution is prepared by suitably mixing ethanol (having a purity 95% and a density 0.8050 g/ml~0.8123 g/ml) and water so that a specific gravity of the mixed ethanol/water solution is 0.982 g/ml~0.986 g/ml, and hereinafter referred to as solution 1. 1 g of dioctyl phthalate (DOP, having a density of 0.985 g/ml and a specific gravity of 1.486~1.487 g/ml) is diluted with a pure ethanol of 100 ml. 10 ml of the diluted solution is re-diluted with a pure ethanol to a final volume of 100 ml. The re-diluted solution is hereinafter referred to as solution 2.

A: 20 ml of the solution 2 is diluted with the solution 1 to a final volume of 100 ml.

B: 10 ml of the solution 2 is diluted with the solution 1 to a final volume of 100 ml.

C: 5 ml of the solution 2 is diluted with the solution 1 to a final volume of 100 ml.

D: 2 ml of the solution 2 is diluted with the solution 1 to a final volume of 100 ml.

E: 1 ml of the solution 2 is diluted with the solution 1 to a final volume of 100 ml.

The above standard solutions are measured for absorbance at the wavelength of 272 nm using a UV-vis. spectrophotometer, and then calibration curves are plotted using the absorbance, as shown in FIG. 12.

The samples 1, 2 and 3 prepared in the example 1 each is input into 100 ml of the solution 1, sealed, and kept at a constant ambient temperature of 37±1° C. for 24 hours, and then absorbance of the samples is measured at the wavelength of 272 nm by the above-mentioned method to determine the concentration, which is shown in FIG. 13.

According to FIG. 13, it is revealed that when the samples 1 and 2 are compared with the sample 3, $CD_{1.0}$-PVC/DOP suppresses migration of a plasticizer to about 30%.

INDUSTRIAL APPLICABILITY

As described above, a method for manufacturing a PVC product capable of suppressing migration of a plasticizer according to the present invention uses cyclodextrin derivatives, which are replaced by a predetermined compound and form a complex with a low molecular weight liquid plasticizer, and are capsulated and uniformly dispersed in PVC at a PVC polymerization step. Therefore, a problem of a conventional PVC/cyclodextrin complex, i.e. reduction of physical and mechanical properties is solved in a simple and economical manner. The PVC product is manufactured by mixing the low molecular weight liquid plasticizer with the prepared cyclodextrin particles-capsulated PVC particles, which utilizes a conventional PVC producing equipment, thereby mass-producing PVC capable of suppressing migration of a plasticizer in an economical manner.

In the manufactured PVC product, cyclodextrin derivatives which can form a complex with a low molecular weight liquid plasticizer, are uniformly dispersed, thereby improving suppression efficiency of migration of the plasticizer without deterioration of its mechanical property.

The invention claimed is:

1. A method for manufacturing poly(vinyl chloride) (PVC) product containing cyclodextrin derivatives with suppression of the migration of plasticizer, the method comprising:

(S1) preparing cyclodextrin derivative particles represented by the following Formula 3;

(S2) inputting the cyclodextrin derivative particles, a water-based dispersion medium and a vinyl chloride monomer into a reactor and performing polymerization to obtain cyclodextrin derivative particles-capsulated PVC particles, in which a plurality of the cyclodextrin derivative particles are dispersedly capsulated in PVC particles; and (S3) mixing the cyclodextrin derivative particles-capsulated PVC particles with any one liquid plasticizer selected from the group consisting of a phthalate plasticizer, an liphatic diester plasticizer, a trimellitate plasticizer and a phosphate plasticizer, and molding the mixture in a predetermined shape using heat:

Formula 3

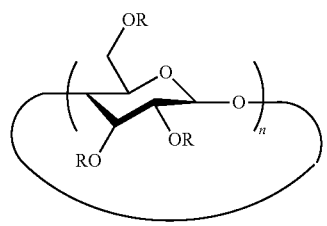

where R each is independently hydrogen, or substituted group of a silane functional group having 1 to 60 carbon atoms, represented by the following Formula 5, and has a degree of substitution of 5 to 100%, and n is an integer of 6 to 26, Formula 4

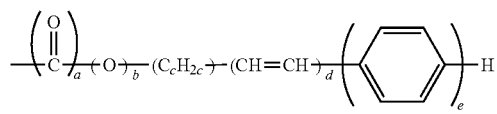

where a, b, c, d and e each is an integer of at least 0, a+b+c+c+d+e is at least 1, and a linking order between constituent units according to a, b, c, d and e is randomly changed, Formula 5

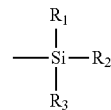

where $R_1$, $R_2$ and $R_3$ each is independently the hydrocarbon functional group having 1 to 20 carbon atoms, represented by the Formula 4, and at least one of $R_1$, $R_2$ and $R_3$ has a vinyl group.

2. The method for manufacturing poly(vinyl chloride) (PVC) product containing cyclodextrin derivatives with suppression of the migration of plasticizer according to claim 1, wherein the functional group represented by the Formula 5 is

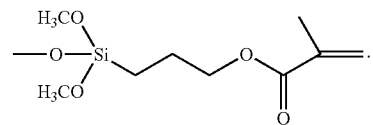

3. The method for manufacturing PVC product containing cyclodextrin derivatives with suppression of the migration of plasticizer according to claim 1, wherein the phthalate plasticizer is any one selected from the group consisting of dimethyl phthalate (DMP), dibutyl phthalte (DBP), di-isobutyl phthalate (DIBP), dihexyl phthalate (DHP), dioctyl phthalate (DOP), diisooctyl phthalate (DIOP), dinonyl phthalate (DNP), di-isodecyl phthalate (DIDP) and benzyl butyl phthalate (BBP), and a mixture thereof.

4. The method for manufacturing PVC product containing cyclodextrin derivatives with suppression of the migration of plasticizer according to claim 1, wherein the cyclodextrin derivative particles have an average diameter of 1 to 50 nm, and the cyclodextrin derivative particles-capsulated PVC particles have an average diameter of 10 to 500 μm.

5. The method for manufacturing PVC product containing cyclodextrin derivatives with suppression of the migration of plasticizer according to claim 1, wherein the cyclodextrin derivative particles have a content of 0.1 to 5 wt % based on the total weight of the cyclodextrin derivative particles-capsulated PVC particles.

6. A PVC product containing cyclodextrin derivatives with suppression of the migration of plasticizer, the PVC product being manufactured by molding a mixture in a predetermined shape using heat, the mixture comprising:

(a) a plurality of cyclodextrin derivative particles-capsulated PVC particles including PVC particles and cyclodextrin derivative particles represented by the following Formula 3 being dispersedly capsulated in the PVC particles; and (b) any one liquid plasticizer selected from the group consisting of a phthalate plasticizer, an liphatic diester plasticizer, a trimellitate plasticizer and a phosphate plasticizer:

Formula 3

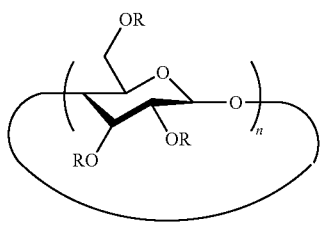

where R each is independently hydrogen or substituted group of a silane functional group having 1 to 60 carbon atoms, represented by the following Formula 5, and has a degree of substitution of 5 to 100%, and n is an integer of 6 to 26, Formula 4

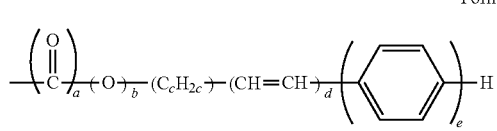

where a, b, c, d and e each is an integer of at least 0, a+b+c+c+d+e is at least 1, and a linking order between constituent units according to a, b, c, d and e is randomly changed, Formula 5

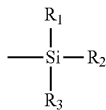

where $R_1$, $R_2$ and $R_3$ each is independently the hydrocarbon functional group having 1 to 20 carbon atoms, represented by the Formula 4 and at least one of $R_1$, $R_2$ and $R_3$ has a vinyl group.

7. The PVC product containing cyclodextrin derivatives with suppression of the migration of plasticizer according to claim 6, wherein the functional group represented by the Formula 5 is

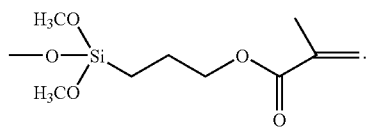

8. The PVC product containing cyclodextrin derivatives with suppression of the migration of plasticizer according to claim 6, wherein the phthalate plasticizer is any one selected from the group consisting of dimethyl phthalate (DMP), dibutyl phthalate (DBP), di-isobutyl phthalate (DIBP), dihexyl phthalate (DHP), dioctyl phthalate (DOP), diisooctyl phthalate (DIOP), dinonyl phthalate (DNP), diisodecyl phthalate (DIDP) and benzyl butyl phthalate (BBP), and a mixture thereof.

9. The PVC product containing cyclodextrin derivatives with suppression of the migration of plasticizer according to claim 6, wherein the cyclodextrin derivative particles have a content of 0.1 to 5 wt % based on the total weight of the cyclodextrin derivative particles-capsulated PVC particles.

* * * * *